United States Patent
Kozilek et al.

(10) Patent No.: US 9,556,949 B2
(45) Date of Patent: Jan. 31, 2017

(54) GEAR WHEEL

(71) Applicant: ASTRIUM GMBH, Taufkirchen (DE)

(72) Inventors: Horst N. Kozilek, Friedrichshafen (DE); Bernhard Specht, Heiligenberg (DE)

(73) Assignee: ASTRIUM GMBH, Taufkirchen (DE)

( * ) Notice: Subject to any disclaimer, the term of this patent is extended or adjusted under 35 U.S.C. 154(b) by 72 days.

(21) Appl. No.: 13/753,966

(22) Filed: Jan. 30, 2013

(65) Prior Publication Data
US 2013/0192403 A1    Aug. 1, 2013

(30) Foreign Application Priority Data
Jan. 31, 2012    (DE) .................. 10 2012 001 703

(51) Int. Cl.
*F16H 55/14*    (2006.01)
*F16H 57/00*    (2012.01)

(52) U.S. Cl.
CPC .......... *F16H 57/0006* (2013.01); *F16H 55/14* (2013.01); *Y10T 74/1987* (2015.01)

(58) Field of Classification Search
CPC . F16H 55/14; F16H 57/0006; F16H 2055/366
USPC ................. 74/434, 440, 443, 446, 447, 449
See application file for complete search history.

(56) References Cited

U.S. PATENT DOCUMENTS

| | | | | |
|---|---|---|---|---|
| 37,634 A * | 2/1863 | Morley | | 74/443 |
| 288,134 A * | 11/1883 | Stone, Jr. | | 74/443 |
| 623,883 A * | 4/1899 | Cameron | | 295/11 |
| 1,427,721 A * | 8/1922 | Christenson | | 74/443 |
| 1,666,576 A * | 4/1928 | Lytle | | 74/445 |
| 1,771,370 A * | 7/1930 | Benge | | 74/449 |
| 1,928,763 A * | 10/1933 | Rosenberg | | 464/99 |
| 2,307,129 A * | 1/1943 | Hines et al. | | 464/89 |
| 2,390,168 A * | 12/1945 | Piot | | F16B 7/0406 403/227 |
| 3,226,996 A * | 1/1966 | Breuer | | 74/421 R |
| 3,385,127 A * | 5/1968 | Naruse et al. | | 74/443 |
| 4,078,445 A * | 3/1978 | Kiser, Jr. | | F16H 55/30 29/893.3 |
| 5,927,149 A * | 7/1999 | Moody | | F16H 55/14 464/89 |
| 6,508,140 B2 * | 1/2003 | Zaps | | F16D 7/04 29/893.1 |

(Continued)

FOREIGN PATENT DOCUMENTS

| | | |
|---|---|---|
| DE | 311 406 | 3/1919 |
| DE | 433 120 | 8/1926 |

(Continued)

OTHER PUBLICATIONS

Machine translation of FR 2 641 351; inventor: Riousset; publication date: Jul. 6, 1990.*

(Continued)

*Primary Examiner* — William C Joyce
(74) *Attorney, Agent, or Firm* — Greenblum & Bernstein, P.L.C.

(57) ABSTRACT

Gear wheel and method for reducing vibrations transmitted by a rotating shaft. The gear wheel includes an inner part, which is connectable to a cause of vibration, a connection element and a ring gear. The connection element is structured and arranged to reduce vibrations.

13 Claims, 3 Drawing Sheets

(56) References Cited

U.S. PATENT DOCUMENTS

| | | | |
|---|---|---|---|
| 6,959,682 B2 * | 11/2005 | Slopsema | F02B 75/06 123/192.1 |
| 2005/0132834 A1 * | 6/2005 | Takeuchi | F16H 55/14 74/431 |
| 2012/0149511 A1 * | 6/2012 | Hodjat | F16D 3/10 474/94 |

FOREIGN PATENT DOCUMENTS

| | | | |
|---|---|---|---|
| DE | 908 317 | | 4/1954 |
| DE | 18 08 162 | | 3/1960 |
| DE | 13 00 408 | | 7/1969 |
| DE | 71 35 220 | | 5/1972 |
| DE | 24 19 189 | | 10/1975 |
| DE | 27 14 020 | | 10/1978 |
| DE | 30 33 250 | | 4/1982 |
| DE | 31 53 109 | | 10/1982 |
| DE | 2 55 649 | | 4/1988 |
| DE | 92 05 374 | | 6/1992 |
| DE | 10 2006 058 467 | | 6/2008 |
| FR | 2 438 764 | | 5/1980 |
| FR | 2 641 351 | * | 7/1990 |
| GB | 2 126 686 | | 3/1984 |
| JP | 2009-222219 | * | 10/2009 |

OTHER PUBLICATIONS

German Search Report and Action conducted in counterpart German Appln. No. 10 2012 001 703.0 (Jan. 31, 2012) (w/partial English language translation).

European Search Report and Action conducted in counterpart European Appln. No. EP 13 00 0229 (Apr. 11, 2013) (w/partial English language translation).

* cited by examiner

GEAR WHEEL

CROSS-REFERENCE TO RELATED APPLICATIONS

The present application claims priority under 35 U.S.C. §119(a) of German Patent Application No. 10 2012 001 703.0 filed Jan. 31, 2012, the disclosure which is expressly incorporated by reference herein in its entirety.

BACKGROUND OF THE INVENTION

1. Field of the Invention

Embodiments of the invention relate to a gear wheel and in particular a gear wheel which includes several components. The gear wheel according to embodiments of the invention can be used particularly advantageously in connection with stepper motors on satellites. However, use of the gear wheel is not limited to this field of application, but can be used advantageously in any arrangement or assembly in which the influence of vibrations, in particular micro-vibrations, should or has to be reduced or minimized.

2. Discussion of Background Information

With the use of stepper motors in arrangements or assemblies, micro-vibrations (micro jitter) are caused by the cogging torque of the rotor. These micro-vibrations are transmitted to the structural parts of the arrangement or the assembly. This leads for example to disturbances in the arrangement or assembly in particular in the instruments thereof or to directing errors. The micro-vibrations are produced for example by permanent magnets in the rotating part of the motor and transmitted as accelerations via the gear wheel to the arrangement or assembly.

SUMMARY OF THE EMBODIMENTS

Embodiments of the invention provide a gear wheel structured so that the effects of vibrations, in particular of micro-vibrations, are reduced.

According to embodiments, the gear wheel includes an inner part, which is connected to a cause of vibrations, a connection element and a ring gear. The connection element is embodied or formed so that the vibrations caused are reduced.

The gear wheel according to embodiments includes an inner part, which is connected to a causer or source of vibrations, in particular micro-vibrations, e.g., a drive shaft of a motor, in particular a stepper motor on a satellite, a connection element and a ring gear. The connection element is embodied or formed so that the vibrations, in particular micro-vibrations, caused are reduced. To this end in particular, the connection element can be connected to the inner part of the gear wheel and the ring gear in a non-positive manner. The invention advantageously reduces vibrations, in particular micro-vibrations, which act on the ring gear.

According to embodiments, the connection element of the gear wheel can be embodied or formed as a spring sheet. It is particularly advantageous when the spring sheet is produced from aluminum, titanium or spring steel. It is furthermore particularly advantageous when the spring sheet has a thickness of at least 0.1 mm.

According to further embodiments, the connection element of the gear wheel can be embodied or formed as a cast plastic ring. It is particularly advantageous when the plastic ring is produced from an elastic synthetic material, e.g., RTV plastic, silicone or a resin system. It is furthermore particularly advantageous if the plastic ring has a thickness of at least 1/10 mm to several millimeters.

Embodiments of the invention are directed to a gear wheel that includes an inner part, which is connectable to a cause of vibration, a connection element and a ring gear. The connection element is structured and arranged to reduce vibrations.

According to embodiments of the invention, the connection element can be coupled to the inner part and to the ring gear in a non-positive manner.

In accordance with embodiments, the connection element can be structured and arranged as a spring sheet. The spring sheet may include at least one of aluminum, titanium and spring steel. Further, the spring sheet can have a thickness of at least 0.1 mm.

Moreover, the connection element may include a cast plastic ring. The plastic ring can include elastic synthetic material. The elastic synthetic material may include at least one of RTV plastic, silicone and a resin system. Further, the plastic ring can have a thickness of at least 1/10 mm.

In embodiments, the inner part can be connectable to a motor via a drive shaft. The motor can be a stepper motor on a satellite.

According to other embodiments, the vibrations can be micro-vibrations and the cause of the vibrations can be a motor of a satellite.

Embodiments of the invention are directed to a gear wheel for connection to a vibrating shaft of a motor. The gear wheel includes an inner part coupleable to the vibrating shaft, a ring gear surrounding the inner part and a connection element structured and arranged to couple the inner part to the ring gear so as to reduce an amplitude of vibrations in the vibrating shaft transmitted to the ring gear.

According to embodiments, the vibrations in the vibrating shaft may be micro-vibrations.

In accordance with other embodiments, the motor can be structured for use in a satellite.

According to still other embodiments, the motor may include a stepper motor in a satellite.

In further embodiments, the connection element can have a radial thickness of about 0.1 mm and may include one of spring sheet and a cast plastic ring. Moreover, when the connection element is spring sheet, the spring sheet can include at least one of aluminum, titanium and spring steel. When the connection element is a cast plastic ring, the cast plastic ring can include at least one of RTV plastic, silicone and a resin system.

Embodiments of the invention are directed to a method for reducing vibrations transmitted by a rotating shaft. The method includes connecting a gear wheel to the rotating shaft, the gear wheel having a vibration damping element coupling an inner part for connection to the rotating shaft to a ring gear separated from the inner part.

In accordance with still yet other embodiments of the present invention, the vibrations transmitted by the rotating shaft can be micro-vibrations in a satellite.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied or formed in practice.

Figure 1:
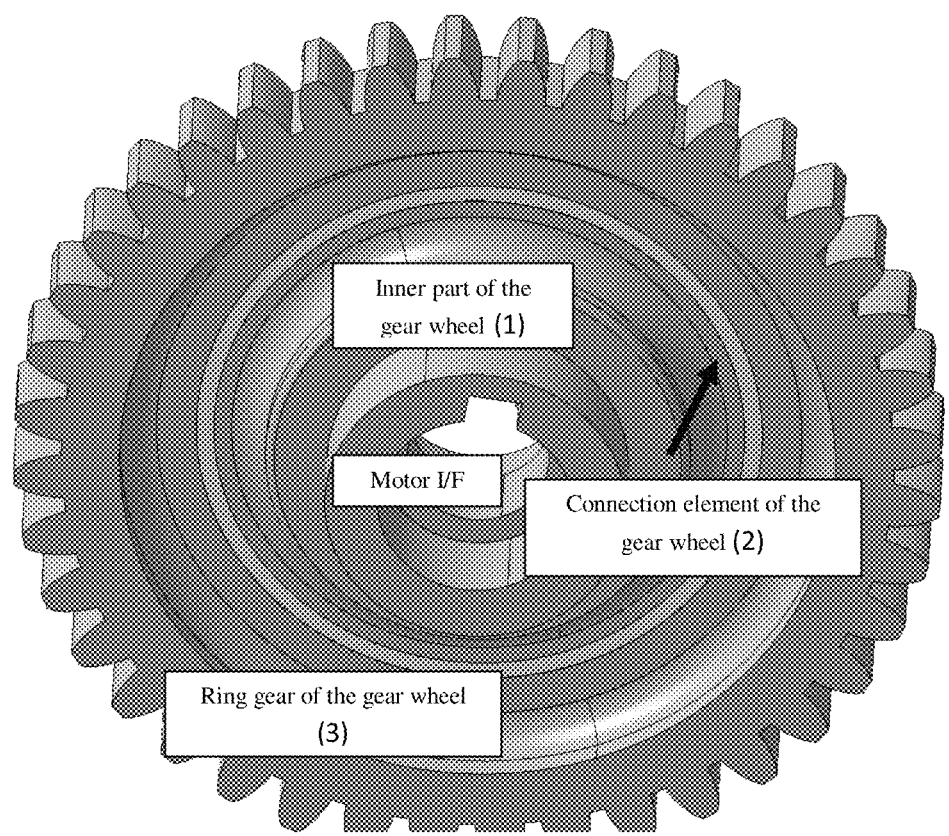
FIG. 1 illustrates an embodiment of the gear wheel including a plastic ring.

FIG. 1 shows an embodiment of the gear wheel. According to the embodiment, the gear wheel can include three parts, i.e., an inner part (1) of the gear wheel, a connection element (2) of the gear wheel and a ring gear (3) of the gear wheel.

Figure 3:
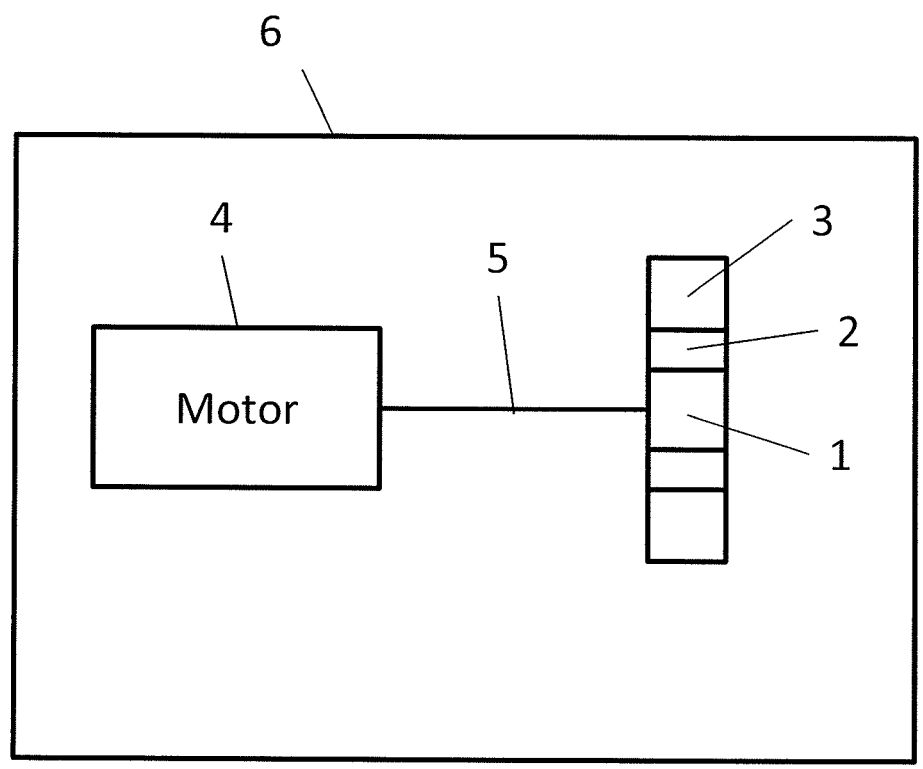
FIG. 3 illustrates in block form an exemplary connection of the gear wheel to the vibrating shaft, motor and satellite.

The inner part (1) of the gear wheel can be embodied or formed so that it can be connected, e.g., to a motor (4) via a drive shaft (5), as shown in FIG. 3. The motor (4) and/or the drive shaft (5) identified are merely exemplary possible devices or elements causing or acting as sources for vibrations, and more particularly for micro-vibrations. However, it is understood that any number of devices causing or acting as sources for vibrations and/or micro-vibrations are known and can be associated with the exemplary gear wheel without departing from the spirit and scope of the embodiments. Thus, it is understood that the embodiments of the invention can likewise be applied and used in combination with such other causes or sources of vibrations, in particular micro-vibrations.

The connection element (2) is embodied or formed such that the vibrations, in particular micro-vibrations, which are caused, e.g., by the drive shaft (5) of the motor (4) and act on the ring gear (3), are reduced by the reduced stiffness (inertia of the system). To this end, the connection element (2) according to the invention is connected to the inner part (1) and the ring gear (3) in a non-positive manner. The reduction factor achieved thereby depends on the thickness and the stiffness of the connection element (2).

According to the embodiments, the stiffness of the connection element (2), which can be embodied or formed, e.g., as individual sheets or ring, can be of particular significance.

According to the embodiment in FIG. 1, the connection element (2) of the gear wheel is embodied or formed as a cast plastic ring. The plastic ring serves as a force transmission element. According to the invention, it is particularly advantageous if the plastic ring is produced from an elastic synthetic material, e.g., RTV plastic (RTV-S=961) silicone or resin systems. For advantageous reduction properties, the thickness of the plastic ring should be between 1/10 mm up to several millimeters.

It is a technical advantage of this embodiment that the amplitude of the vibrations, in particular micro-vibrations, is reduced to a lower level. By way of example, ten times lower amplitudes are achieved as compared to the case without the plastic ring. In this way, the effect of the vibrations, in particular micro-vibrations, of the motor (4) on instruments of a device, e.g., of a satellite (6), and on the device can thus be minimized.

Figure 2:
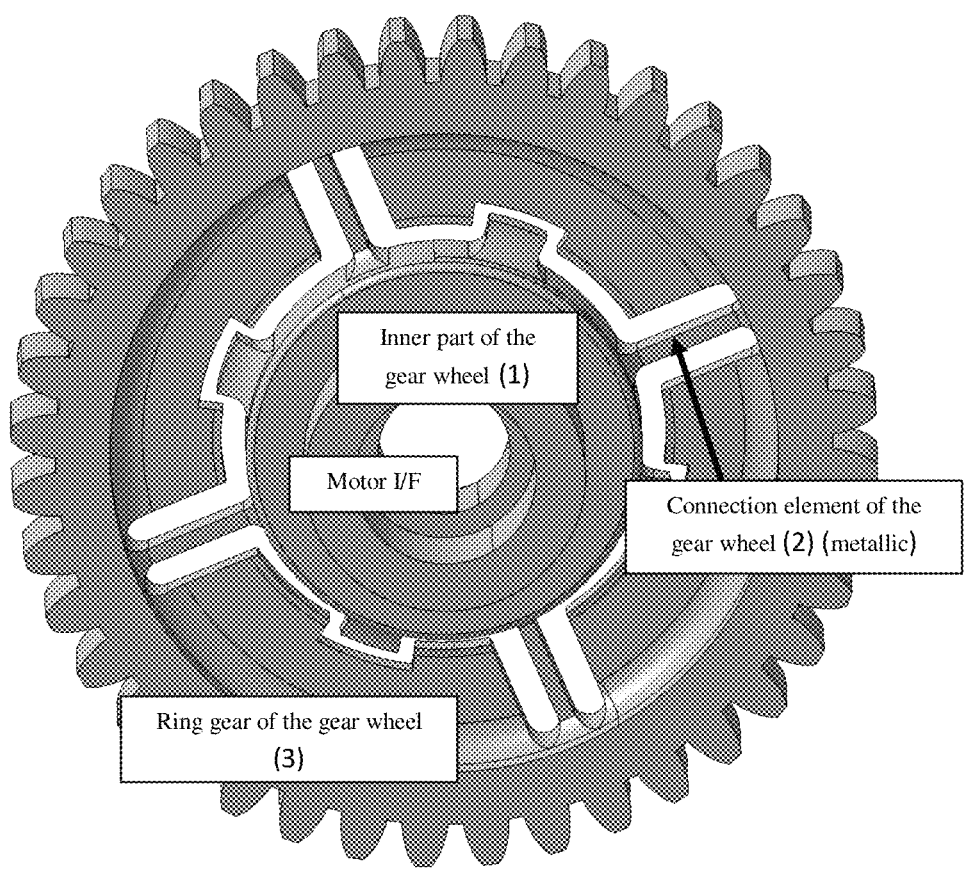
FIG. 2 illustrates an embodiment of the gear wheel including spring sheet.

According to the embodiment in FIG. 2, the connection element of the gear wheel (2) is embodied or formed as a spring sheet. The spring sheet serves as a force-transmitting element. By way of example, connection element (2) can be milled out of the gear wheel or inserted into grooves. According to the embodiments, it is particularly advantageous if the spring sheet is produced from aluminum, titanium or spring steel. For advantageous oscillation properties, the thickness of the spring sheet should be at least 0.1 mm.

A technical advantage of this embodiment is that the amplitude of vibrations, in particular micro-vibrations, is reduced to a lower level. For example, ten times lower amplitudes are achieved as compared to the case without spring sheet. The effect of the vibrations, in particular micro-vibrations, of the motor (4) on instruments of a device, e.g., a satellite (6) and on the device can thus be minimized.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed:

1. A micro-vibration reducing gear wheel for a motor having a micro-vibrating, rotating shaft, the micro-vibration reducing gear wheel comprising:
   an inner part, which is connectable to the micro-vibrating shaft of the motor;
   a connection element formed by
      radiating arms formed in a spring sheet; and
   a ring gear,
   wherein the radiating arms are coupled to the inner part and to the ring gear,
   wherein the connection element is structured and arranged to reduce micro-vibrations radiating from the inner part to the ring part, and
   wherein the connection element is coupled to the inner part with a non-positive connection and the connection element is coupled to the ring gear with a non-positive connection.

2. The gear wheel according to claim 1, wherein the spring sheet comprises at least one of aluminum, titanium and spring steel.

3. The gear wheel according to claim 1, wherein the spring sheet has a thickness of at least 0.1 mm.

4. The gear wheel according to claim 1, wherein the micro-vibrating shaft is a drive shaft of a satellite motor.

5. The gear wheel according to claim 1, wherein the motor is a stepper motor on a satellite.

6. A micro-vibration reducing gear wheel for connection to a micro-vibrating shaft of a motor, the micro-vibration reducing gear wheel comprising:
- an inner part coupleable to the micro-vibrating shaft of the motor;
- a ring gear surrounding the inner part; and
- a connection element formed by
  - radiating arms formed in a spring sheet that are connected to the inner part and to the ring gear,
- wherein the connection of the radiating arms to the inner part and to the ring gear reduces an amplitude of micro-vibrations transmitted to the ring gear from the micro-vibrating shaft of the motor, and
- wherein the connection element is coupled to the inner part with a non-positive connection and the connection element is coupled to the ring gear with a non-positive connection.

7. The gear wheel according to claim 6, wherein the motor having the vibrating shaft to which the inner part is coupleable is structured for use in a satellite.

8. The gear wheel according to claim 6, wherein the motor comprises a stepper motor in a satellite.

9. The gear wheel according to claim 6, wherein the connection element has a radial thickness of about 0.1 mm.

10. The gear wheel according to claim 9, wherein the connection element comprises at least one of aluminum, titanium and spring steel.

11. A method for reducing micro-vibrations transmitted by a rotating shaft of a motor, the method comprising:
- connecting a micro-vibrating reducing gear wheel to the rotating shaft of the motor, the micro-vibrating reducing gear wheel having a micro-vibration damping element comprising radiating arms formed in a spring sheet coupling an inner part of the micro-vibrating reducing gear that is connected to the rotating shaft of the motor to a ring gear separated from the inner part,
- wherein the radiating arms are coupled to the rotating shaft with a non-positive connection and the radiating arms are coupled to the ring gear with a non-positive connection.

12. The method according to claim 11, wherein the micro-vibrations are transmitted by a satellite motor.

13. The method according to claim 11, wherein the rotating shaft of the motor transmits micro-vibrations to the inner part of the micro-vibrating reducing gear and the micro-vibration damping element is structured and arranged to reduce the micro-vibrations radiating from the inner part of the micro-vibrating reducing gear toward the outer ring of the micro-vibrating reducing gear.

* * * * *